(12) United States Patent
Witney et al.

(10) Patent No.: US 10,238,088 B2
(45) Date of Patent: Mar. 26, 2019

(54) DISPENSER

(71) Applicant: Cherelle Jean Witney, Attadale (AU)

(72) Inventors: Cherelle Jean Witney, Attadale (AU); Edward Joseph Khoury, Bateman (AU)

(73) Assignee: Cherelle Jean Witney, Attadale (AU)

( * ) Notice: Subject to any disclaimer, the term of this patent is extended or adjusted under 35 U.S.C. 154(b) by 688 days.

(21) Appl. No.: 14/652,439

(22) PCT Filed: Dec. 13, 2013

(86) PCT No.: PCT/AU2013/001470
§ 371 (c)(1),
(2) Date: Jun. 15, 2015

(87) PCT Pub. No.: WO2014/089640
PCT Pub. Date: Jun. 19, 2014

(65) Prior Publication Data
US 2015/0313178 A1 Nov. 5, 2015

(30) Foreign Application Priority Data

Dec. 14, 2012 (AU) .................. 2012905472

(51) Int. Cl.
*G07F 11/06* (2006.01)
*A01K 5/02* (2006.01)
*A01K 15/02* (2006.01)

(52) U.S. Cl.
CPC .............. *A01K 5/0291* (2013.01); *A01K 5/02* (2013.01); *A01K 15/025* (2013.01); *G07F 11/06* (2013.01)

(58) Field of Classification Search
CPC ......................................... G07F 11/06
USPC ............... 119/54, 51.13, 51.11, 57.1, 57.92, 119/51.01–69
See application file for complete search history.

(56) References Cited

U.S. PATENT DOCUMENTS

| | | | | |
|---|---|---|---|---|
| 3,384,266 A | * | 5/1968 | Schuller | A47F 1/04 221/90 |
| 3,589,556 A | * | 6/1971 | Wittern | G07F 11/06 221/89 |
| 6,405,674 B1 | * | 6/2002 | Majewski | A01K 5/0291 119/51.13 |

* cited by examiner

*Primary Examiner* — Timothy R Waggoner
*Assistant Examiner* — Ayodeji T Ojofeitimi
(74) *Attorney, Agent, or Firm* — Tope-McKay & Associates

(57) ABSTRACT

A dispenser (10) comprising a first housing portion (14) including an elongate planar member (15). A second housing portion (16) is moveable between an open position and a closed position such that, in the closed position, a tubular chamber having an open lower end is defined. A plurality of platforms (22) are each pivotally secured adjacent a first edge (24) thereof to a first surface (20) of the elongate planar member (15). A protrusion (28) is provided on the first edge (24) of each platform (24) such that the protrusion extends through an aperture (27) in the elongate planar member (15). A support member (26) is provided on a second opposite surface (21) of the elongate planar member (15) adjacent each of the apertures (27). Each support member (26) is moveable between a first position in which the support member (26) engages with the protrusion (28) to hold the platform (22) in a horizontal position and a second position in which the platform (22) moves to a vertical position thereof.

18 Claims, 14 Drawing Sheets

DISPENSER

FIELD OF THE INVENTION

The present invention relates to a dispenser for dispensing toys and treats for pets.

BACKGROUND TO THE INVENTION

Pets such as dogs must on occasion be left unattended in the home. Dogs that are left on their own however can become bored, which can in turn lead to destructive behaviour or barking. While it is common to leave items such as chewable toys for the dog to play with, these items may only hold the dog's interest for a short period of time.

Various dispensers have been devised to release a series of items from within a housing. Such dispensers have utilised a range of mechanisms to support an item and then release it at a designated time.

The present invention relates to a dispenser provided to release items for an animal, such as toys and treats, over a period of time in order to reduce the likelihood that the animal will become bored during this time. The dispenser comprises an improved construction making it both effective in operation, compact and suitable for mounting in locations in which it may be desirable to release items for a pet.

SUMMARY OF THE INVENTION

According to one aspect of the present invention there is provided a dispenser comprising:
a first housing portion including an elongate planar member;
a second housing portion moveable between an open position and a closed position such that, in the closed position, a tubular chamber having an open lower end is defined between the first and second housing portions,
a plurality of platforms each pivotally secured adjacent a first edge thereof to a first surface of the elongate planar member such that each platform is pivotable between a first position and a second position;
a protrusion provided on the first edge of each platform such that the protrusion extends through an aperture in the elongate planar member when the platform is in the first position; and
a support member provided on a second opposite surface of the elongate planar member adjacent each of the apertures;
wherein each support member is moveable between a first position in which the support member engages with the protrusion to hold the platform in the first position and a second position in which the platform moves to the second position thereof.

Preferably the platforms are secured along the length of the first housing portion such that when the first housing portion is mounted vertically, each subsequent platform is located above previous platform.

Preferably the first edges of the platforms are linear and pivotally connected to the first surface such that each platform can pivot about an axis parallel to the first edge between the first position, in which the platform extends generally horizontally, and the second position in which the platform extends generally vertically. Each of the apertures is preferably provided in the planar member adjacent a midpoint of the first edge.

In a preferred embodiment, the second housing portion comprises an elongate member having an arcuate transverse cross section pivotally connected at a lower end to a lower end of the first housing portion.

In one embodiment, each of the platforms includes an arcuate second edge connecting ends of the first edge such that, the curvature of the arcuate second edge is complementary to that of the inner surface of the second housing portion.

Preferably there is provided a timer such that the platforms are moved from the first positions to the second positions in sequence from a lowermost platform to an uppermost platform.

In a preferred embodiment, each protrusion includes an arcuate surface having teeth thereon and wherein the support member comprises a cog driven by a motor such that operation of the motor in a first direction moves the protrusion upwardly, thereby moving the platform to the vertical position, and operation of the motor in a second direction moves the protrusion downwardly thereby moving the platform to the horizontal position.

Preferably the arcuate surface is located such that the centre of the arc defined by the arcuate surface is coaxial with the axis of rotation of the platform. Preferably gearing is provided between the motor and the cog.

In a preferred embodiment, the motor is secured to the second surface of the planar member on a lateral side of the aperture and a shaft of the motor extends horizontally such that the cog is oriented to rotate about a horizontal axis.

Preferably, a pair of hinge mechanisms are provided on each platform located on the first edge thereof, either side of the aperture.

In one embodiment, each of the hinge mechanisms includes a first hinge portion comprising a shaft provided in a notch in the first edge of the platform and each of the second hinge portions comprises a protruding portion extending outwardly from the first surface of the planar member having a recess in an upper side thereof to receive the corresponding shaft of the platform.

Preferably the dispenser is provided with a control panel and display in order to control the timer device and set the times when the support members of each of the platforms moves from the first position to the second position.

The control panel and display are preferably provided on the first surface of the planar member of the first housing portion.

In a preferred embodiment, the dispenser is provided with a speaker that can emit a sound when one of the platforms moves from the first to the second position. Preferably the sound emitted can be recorded through the control panel.

In a preferred embodiment, the first housing portion includes a rear cover comprising a planar wall member having transverse flanges extending along opposed sides thereof such that the planar member is received into the rear cover such that a relatively thin cavity is defined between the rear cover and the planar member, in which the support members are provided.

BRIEF DESCRIPTION OF THE DRAWINGS

The invention will now be described, by way of example, with reference to the following drawings, in which.

DETAILED DESCRIPTION OF PREFERRED EMBODIMENTS

Referring to the Figures, there is shown a dispenser 10 for dispensing various items that may be used to entertain an animal such as a dog. The items may include, for example, balls, chew toys and treats.

Figure 1:
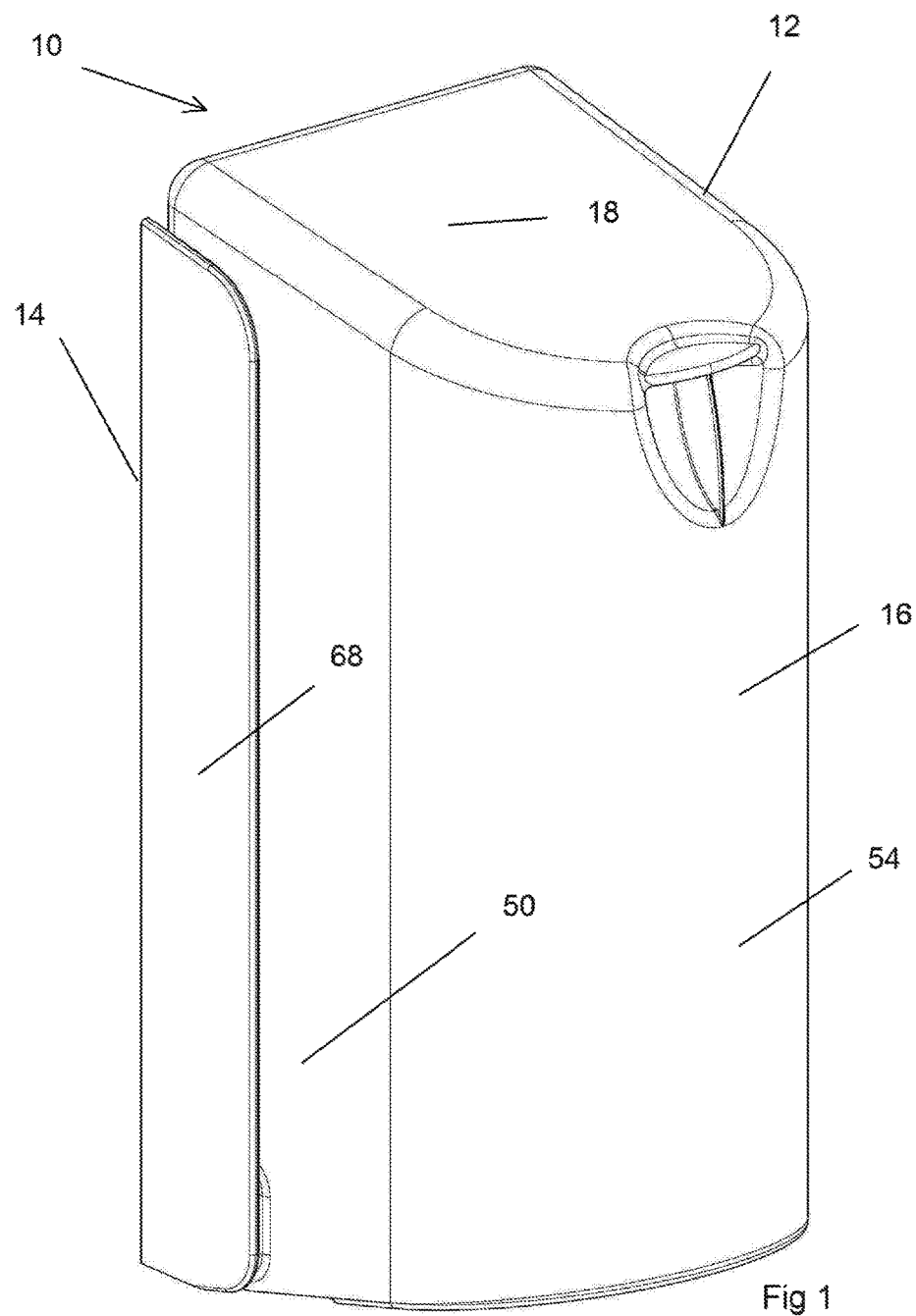
FIG. 1 is a front upper perspective view of a dispenser in accordance with the present invention.
Figure 2:
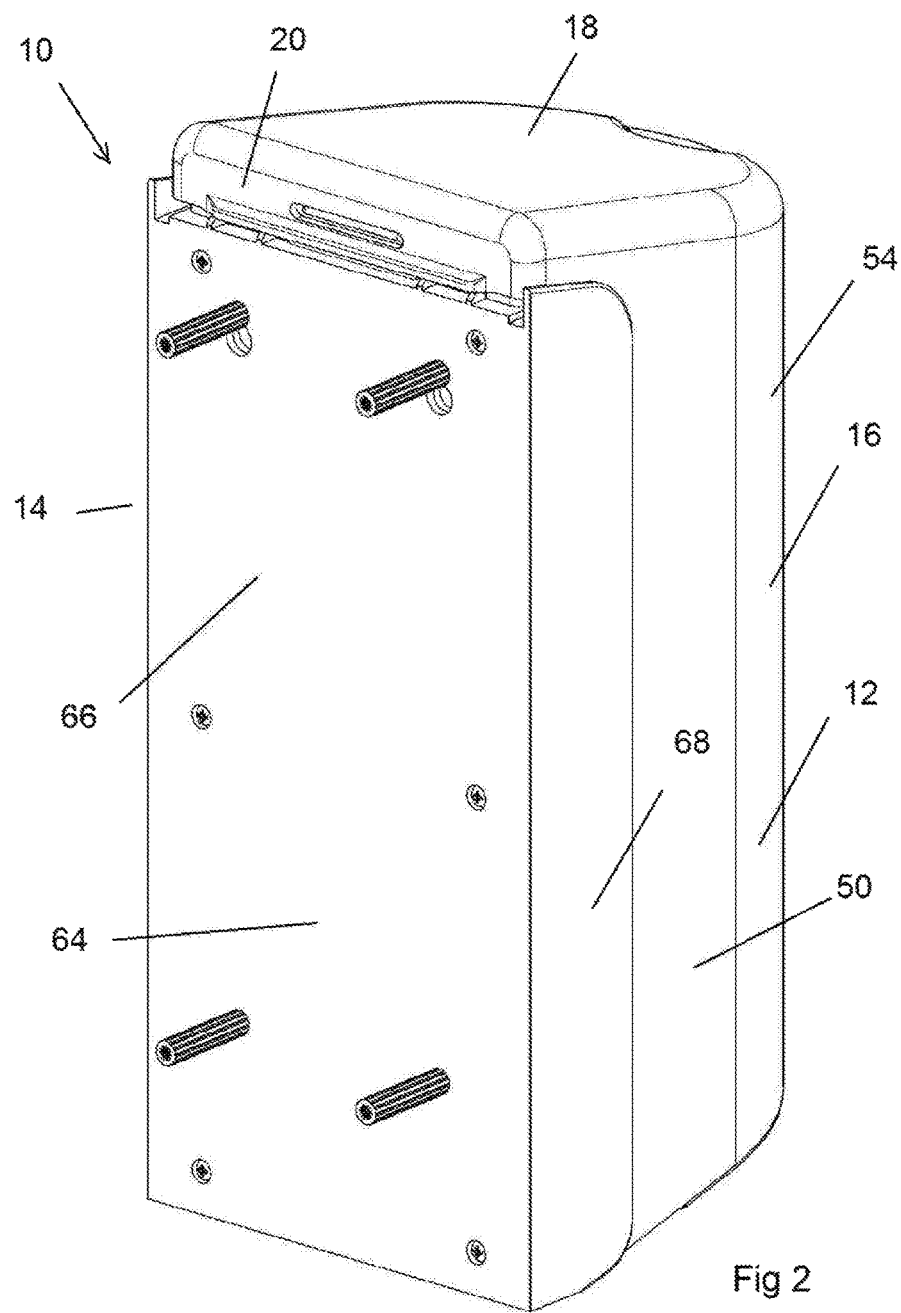
FIG. 2 is a rear upper perspective view of the dispenser of FIG. 1.
Figure 3:
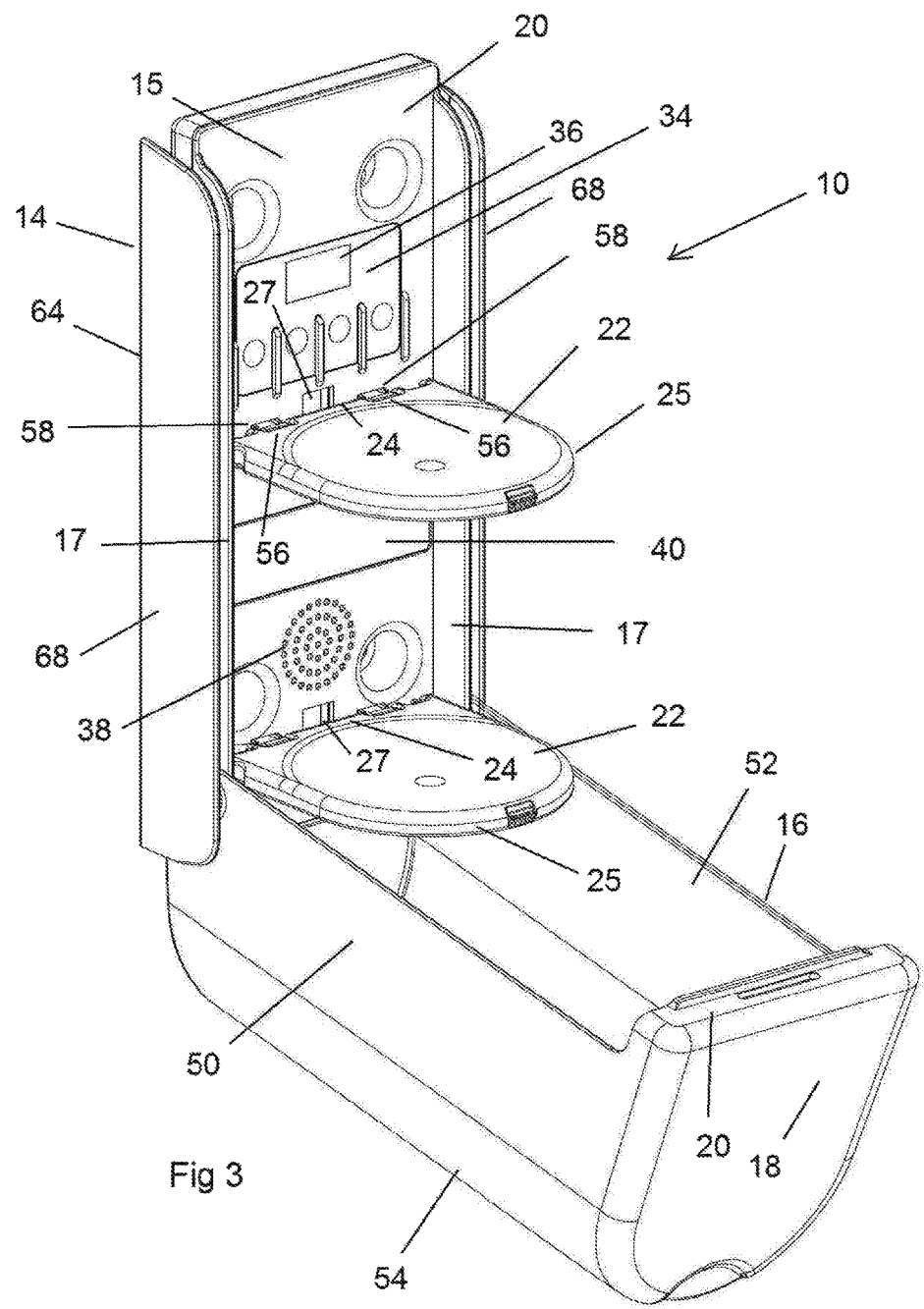
FIG. 3 is a front upper perspective view of the dispenser of FIG. 1 with the housing opened.
Figure 4:
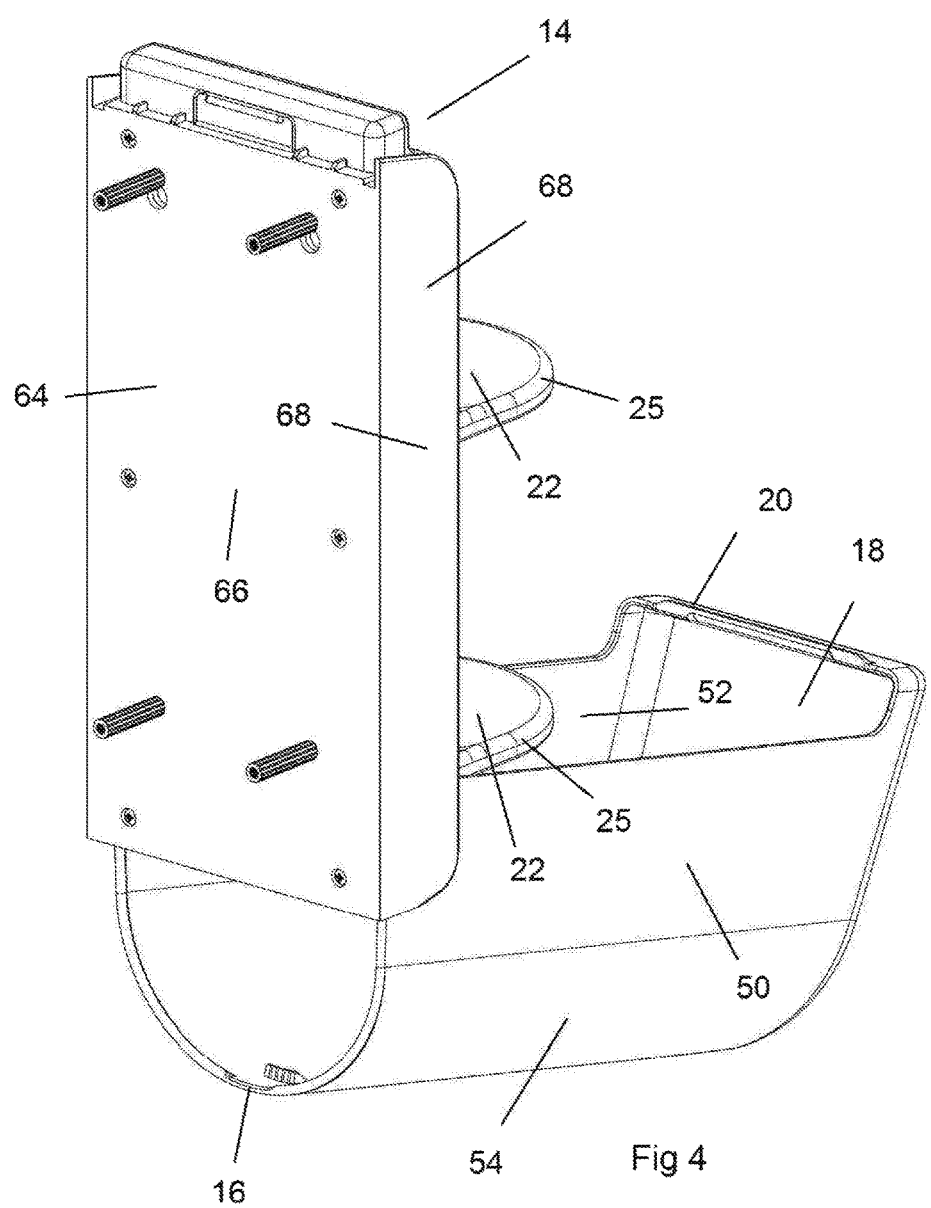
FIG. 4 is a rear upper perspective view of the dispenser of FIG. 1 with the housing opened.
Figure 5:
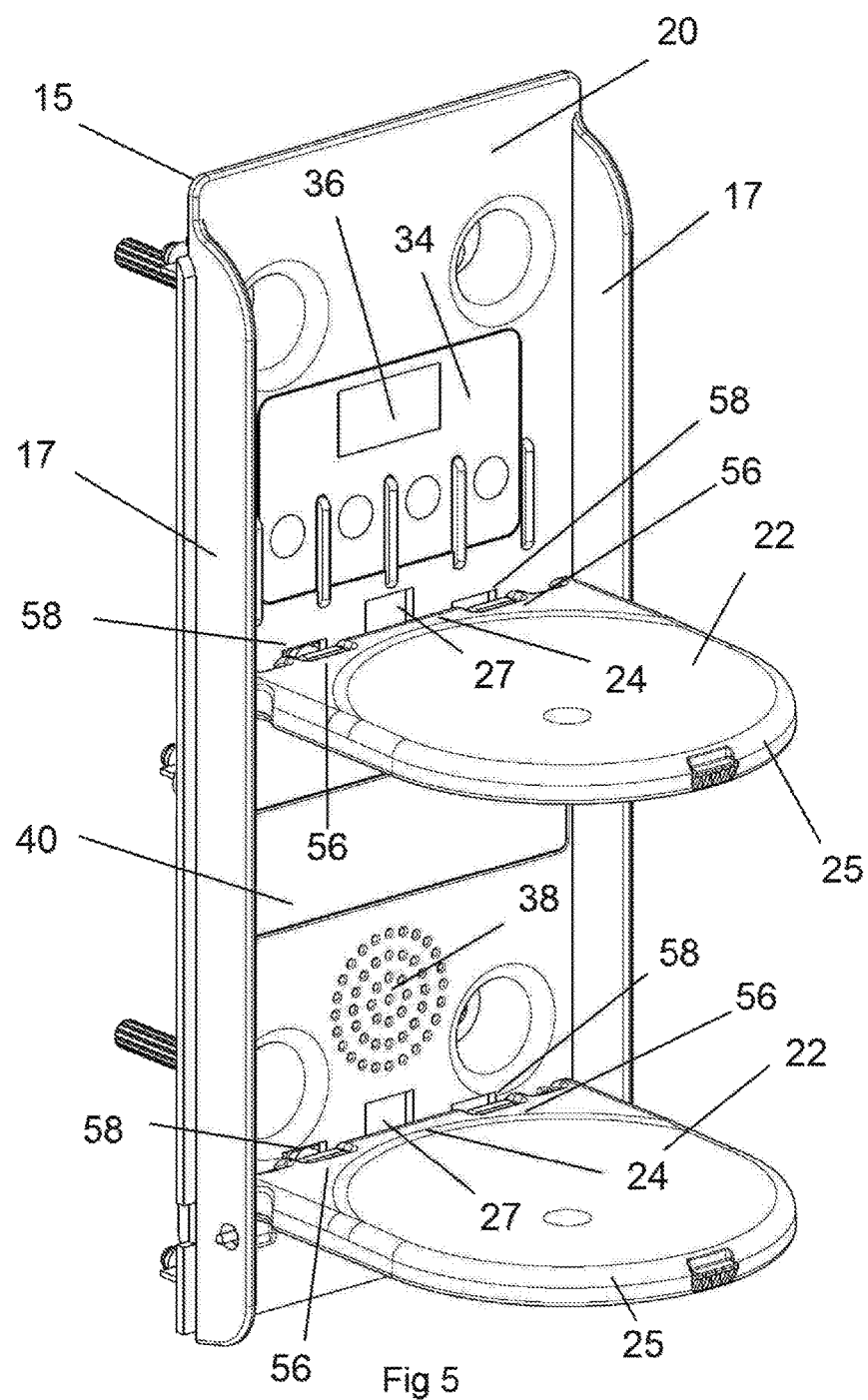
FIG. 5 is a front upper perspective view of the dispenser of FIG. 1 with the second housing portion and the rear cover removed.
Figure 6:
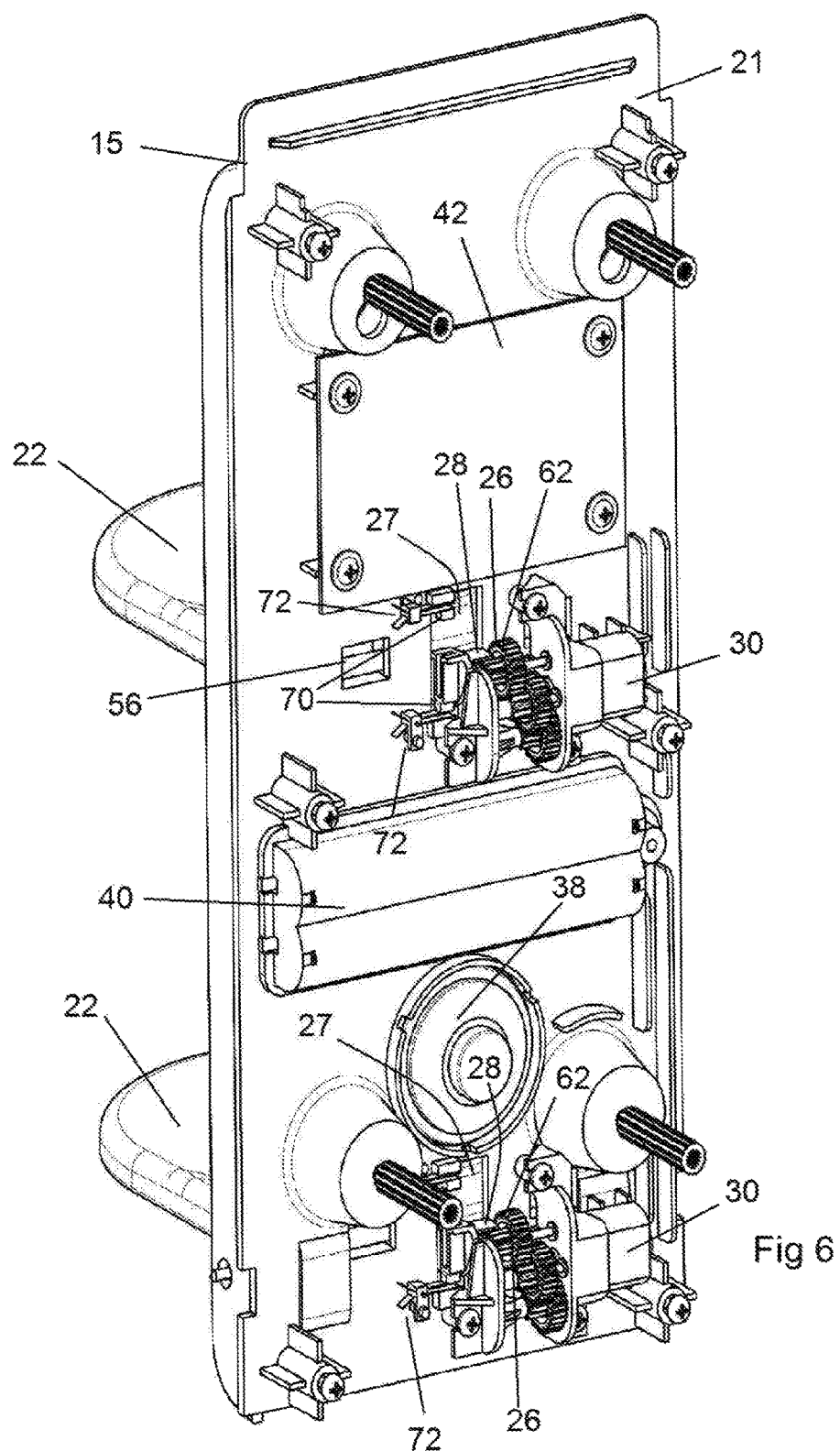
FIG. 6 is a rear upper perspective view of the dispenser of FIG. 1 with the second housing portion and the rear cover removed.
Figure 7:
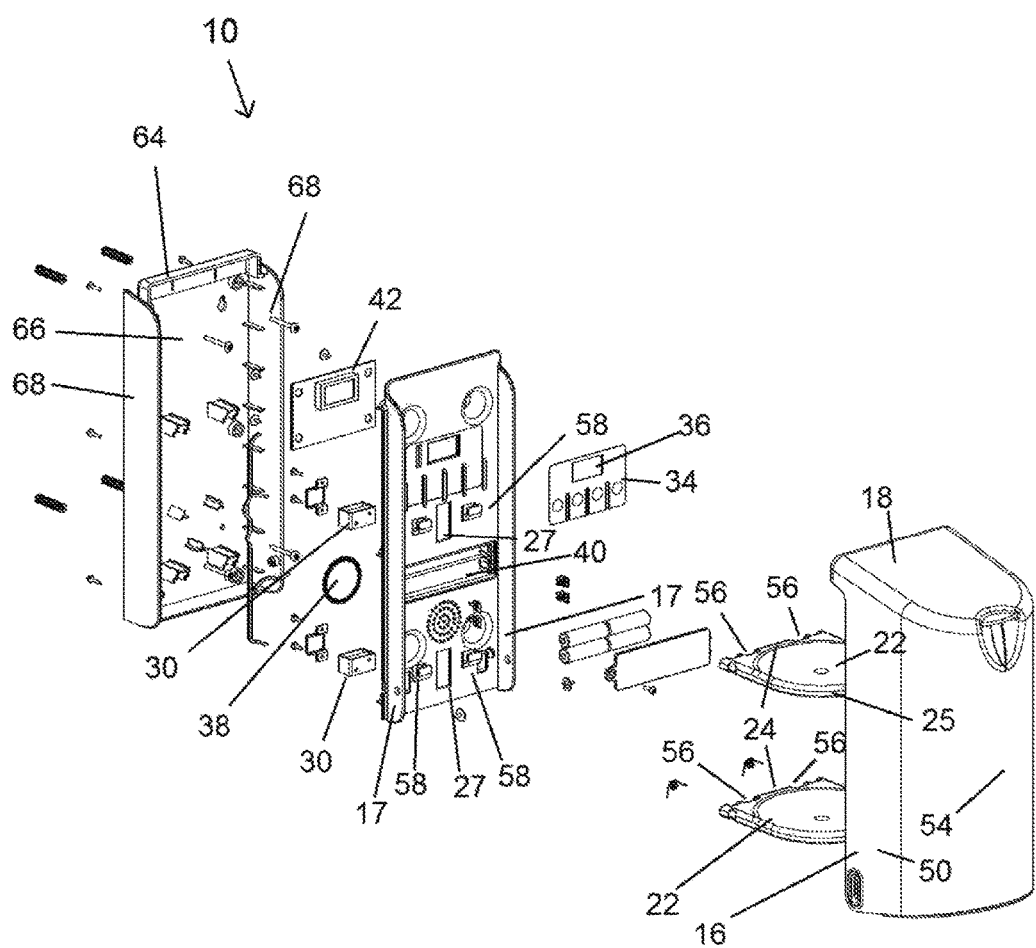
FIG. 7 is an exploded view of the dispenser of FIG. 1.
Figure 8:
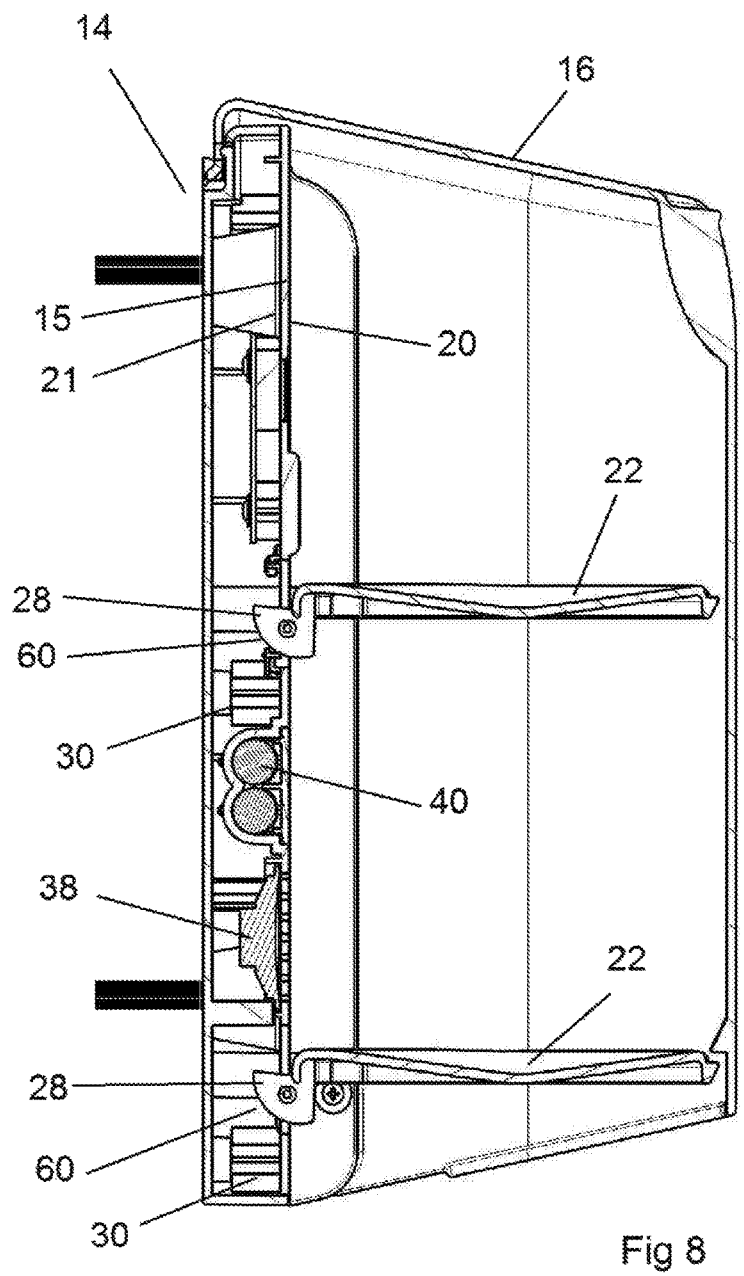
FIG. 8 is a side cross sectional view of the dispenser of FIG. 1.
Figure 9:
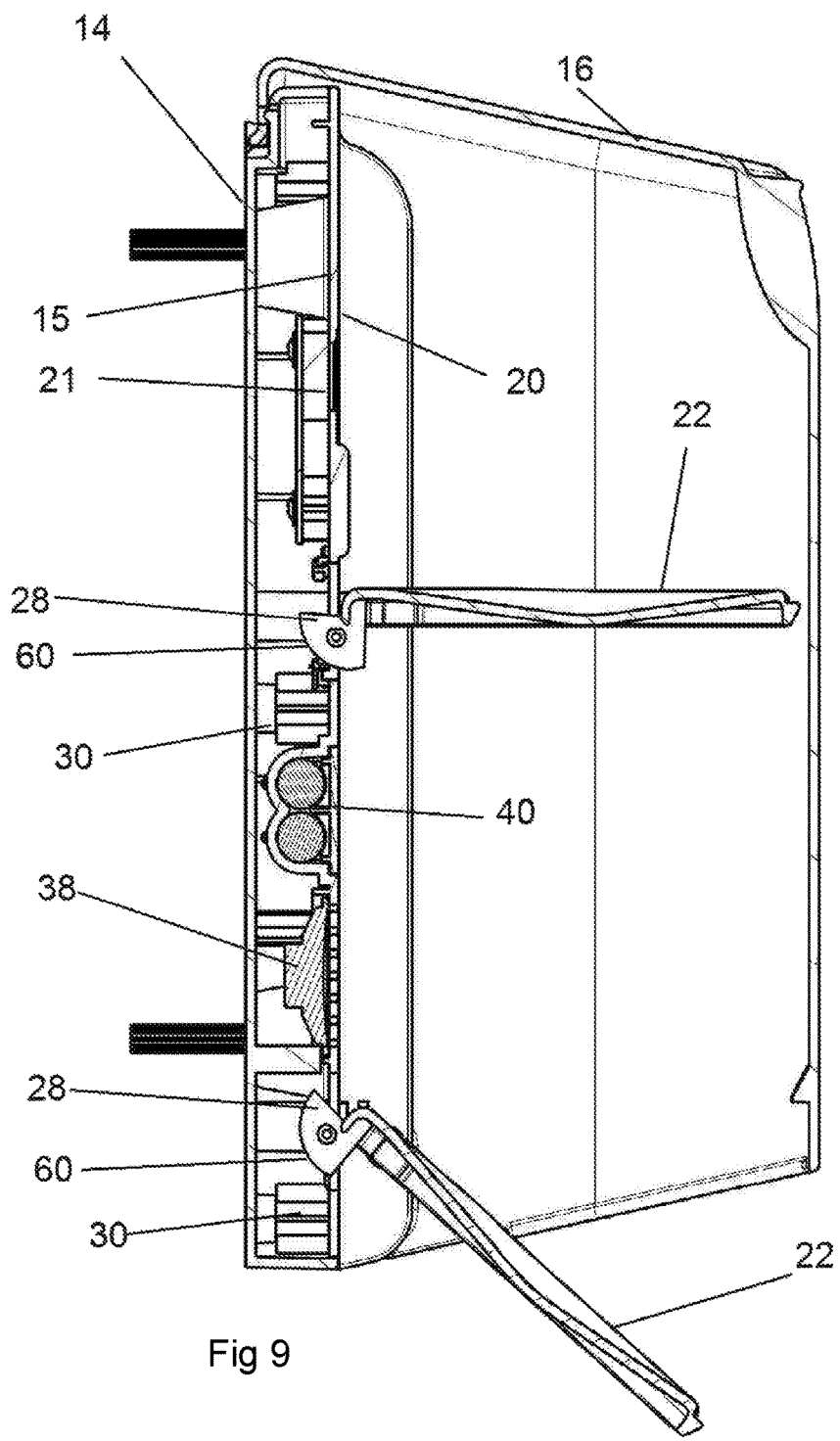
FIG. 9 is a side cross sectional view of the dispenser of FIG. 1 showing the lower platform partway between the first horizontal position and the second vertical position.
Figure 10:
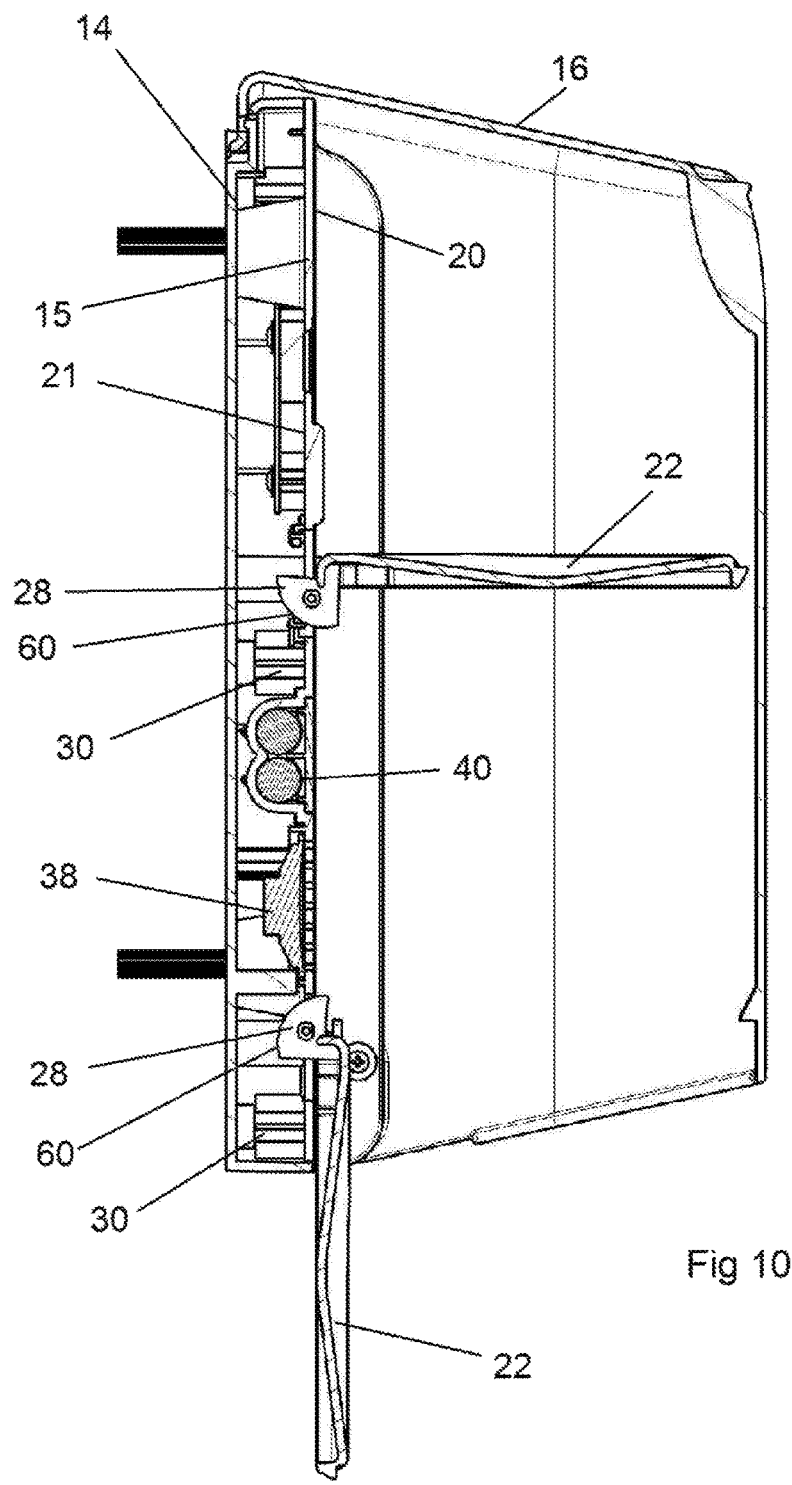
FIG. 10 is a side cross sectional view of the dispenser of FIG. 1 showing the lower platform in the vertical position.
Figure 11:
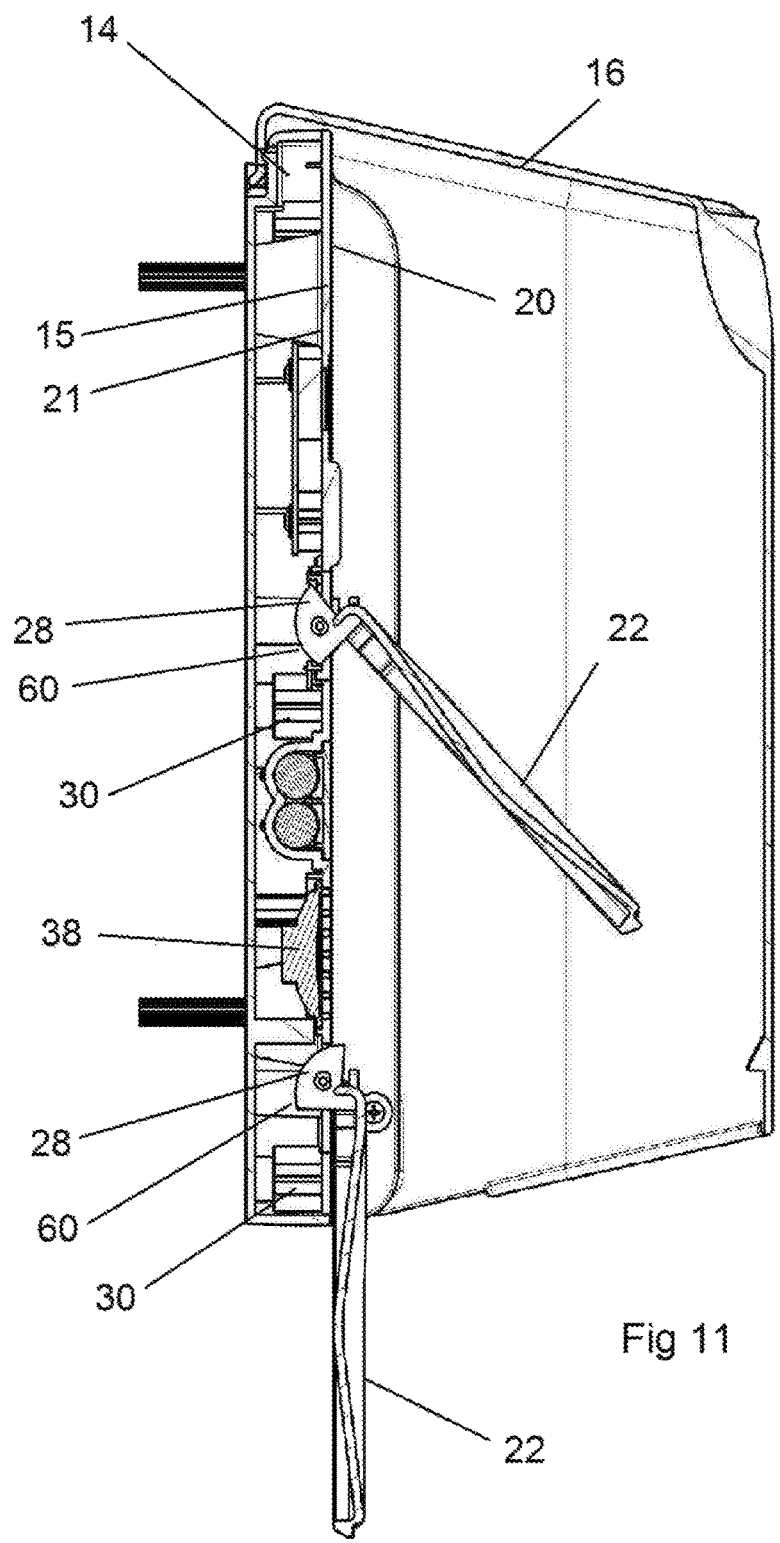
FIG. 11 is a side cross sectional view of the dispenser of FIG. 1 showing the upper platform partway between the horizontal position and the vertical position.

The dispenser comprises a housing 12 formed by a first housing portion 14 and a second housing portion 16. The first housing portion 14 is securable to a vertical surface, such as a wall, and the second housing portion 16 is pivotally secured to the first housing portion 14. The first and second housing portions 14 and 16 are therefore moveable between a closed position (as shown in FIGS. 1 and 2) and an open position (as shown in FIGS. 3 and 4).

The first housing portion 14 includes an elongate planar member 15 that is oriented generally vertically in use. The elongate planar member 15 includes transverse first and second lip portions 17 extending along opposed longitudinal edges thereof.

The second housing portion 16 comprises a planar first side wall 50, a planar second side wall 52 and an arcuate interconnecting wall 54. The first side wall 50 is oriented parallel to the first lip portion 17 such that the first side wall 50 extends transversely outwardly from the first housing portion 14 adjacent the first lip portion 17 when the second housing portion 16 is in the closed position. The second side wall 52 is oriented parallel to the second lip portion 17 such that the second side wall 52 extends transversely outwardly from the first housing portion 14 adjacent the second lip portion 17 when the second housing portion 16 is in the closed position. The interconnecting wall 54 connects edges of the first and second side walls 50 and 52 such that, when the second housing portion 16 is in the closed position, the first and second housing portions 14 and 16 define a tubular chamber oriented generally vertically.

The second housing portion 16 is pivotally connected adjacent a lower end thereof to a lower end of the first housing portion 14. In the embodiment shown, a lower end of the first side wall 50 is pivotally connected to a lower end of the first lip portion 17 and a lower end of the second side wall 52 is pivotally connected to a lower end of the second lip portion 17. The second housing portion 16 is therefore pivotable between the closed position, in which the first and second side walls 50 and 52 of the second housing portion 16 are adjacent the first and second lip portions 17 of the first housing portion 14 respectively and the open position in which the second housing portion 16 extends outwardly from the lower end of the first housing portion 14 (as shown in FIGS. 3 and 4).

The second housing portion 16 includes an upper wall 18 extending across upper ends of the first and second side walls 50 and 52 and the interconnecting wall 54. The upper wall 18 therefore closes the tubular chamber defined between the first and second housing portions 14 and 16 at the upper end. The tubular chamber is open at a lower end thereof.

The upper wall 18 includes a rear lip 20 extending along a side thereof adjacent the first housing portion 14 when the second housing portion 16 is in the closed position. The rear lip 20 is provided to be received over an upper edge of the first housing portion 14 such that the second housing portion 16 can be secured in the closed position by lifting upwardly, moving towards the first housing portion 14 and then lowering such that the rear lip 20 engages over the upper edge of the first housing portion 14.

When the second housing portion 16 is pivoted to the open position, a first surface 20 of the planar member 15 is accessible. The first surface 20 includes a plurality of platforms 22 secured thereto. The platforms 22 are secured along the length of the planar member 15 such that each subsequent platform 22 is located above the previous platform 22. In the embodiment shown, two such platforms 22 are provided. It will be appreciated however that other numbers of platforms 22 may be employed.

Each platform 22 includes a first edge 24 which is pivotally secured to the first surface 20 of the planar member 15. The first edges 24 are linear and connected to the first surface 20 such that each platform 22 can pivot about an axis parallel to the first edge 24 between a first position in which the platform 22 extends generally transversely to the planar member 15 (i.e. horizontally) and a second position in which the platform 22 has pivoted to extend generally parallel to the planar member 15 (i.e vertically).

Each platform 22 includes an arcuate second edge 25 extending from a first end of the first edge 24 to a second end of the first edge 24. The curvature of the arcuate second edge 25 is complementary to that of the inner surface of the second housing portion 16, such that when a platform 22 is in the horizontal position and the housing 12 is closed, the platform 22 extends generally transversely across the chamber to prevent any items in the housing 12 falling past the platform 22.

The first edges 24 of the platforms 22 are pivotally secured to the first surface 20 of the planar member 15. The first edges 24 are provided with a pair of hinge mechanisms located on the first edge 24 thereof. Each of the hinge mechanisms includes a first hinge portion 56 provided on the first edge 24 on the platform 22. The first surface 20 of the planar member 15 is provided with corresponding second hinge portions 58. The first hinge portions 56 each comprise a shaft provided in a notch in the first edge 24 and each second hinge portion 58 comprises a corresponding protruding portion extending outwardly from the first surface 20 of the planar member 15. The protruding portions 58 each include a recess in an upper side thereof to receive the shaft of the first hinge portion 56 such that the platforms 22 are pivotally connected to the planar member 15.

Each of the platforms 22 is provided with a moveable support member 26. The moveable support member 26 is provided adjacent a second opposite surface 21 of the planar member 15 of the first housing portion 14. Therefore when the planar member 15 is mounted vertically adjacent a wall, the support member 26 is located between the planar member 15 and the wall.

Each of the platforms 22 is provided also with a protrusion 28 extending outwardly from the first edge 24 through an aperture 27 in the planar member 15. Each of the apertures 27 is provided adjacent a midpoint of the first edge 24 of the corresponding platform 22. Each support member 26 is located on the second surface 21 adjacent the aperture 27.

When a platform 22 is in the horizontal position, the support member 26 engages the protrusion 28 in a first position to hold the platform 22 in the horizontal position. The support member 26 is moveable from the first position to a second position, wherein movement to the second position moves the platform 22 from the horizontal position to the vertical position.

The protrusion 28 includes an arcuate surface 60 having teeth thereon. The support member 26 comprises cog 62 driven by a motor 30. The cog 62 engages with the teeth on the arcuate surface 60 such that rotation of the cog 62 causes movement of the protrusion 28, and therefore the platform 22. The arcuate surface 60 is located such that the centre of the arc defined by the arcuate surface 60 is coaxial with the axis of rotation of the platform 22. In the embodiment shown, gearing is provided between the motor 30 and the cog 62 to move the platform 22 at the desired rate.

Figure 12:
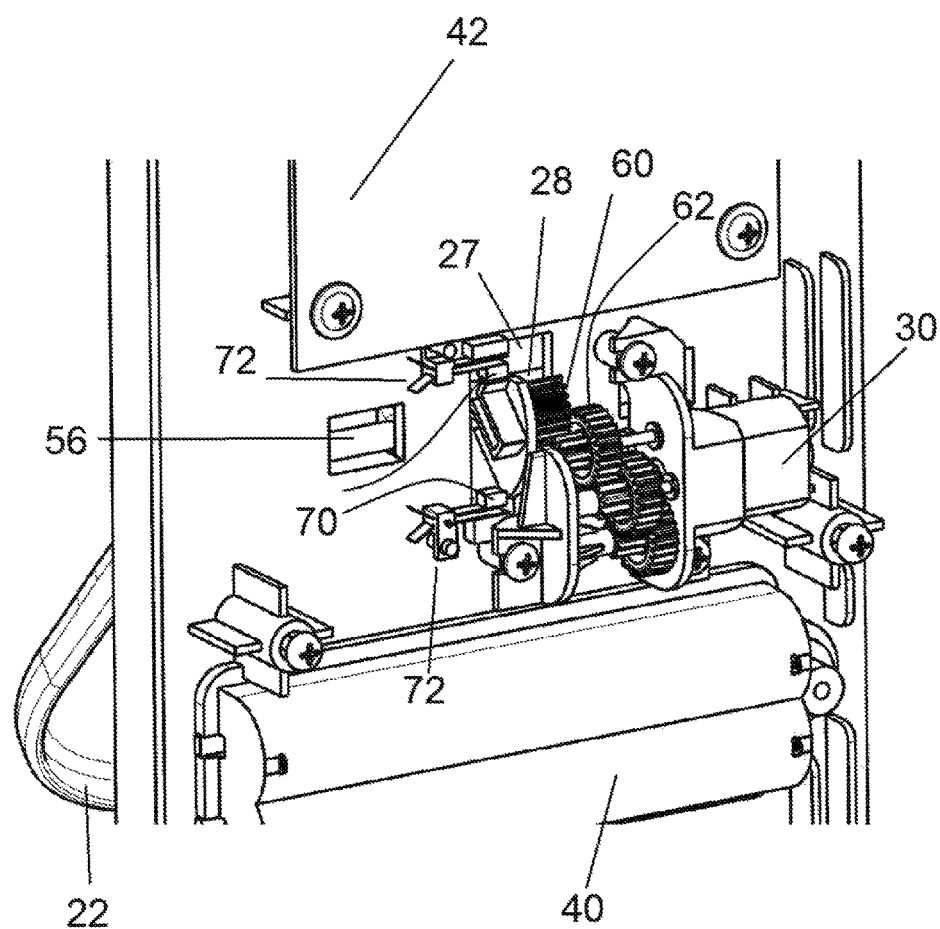
FIG. 12 is a rear perspective view of the first portion of the housing with the upper platform in the position of FIG. 11.
Figure 13:
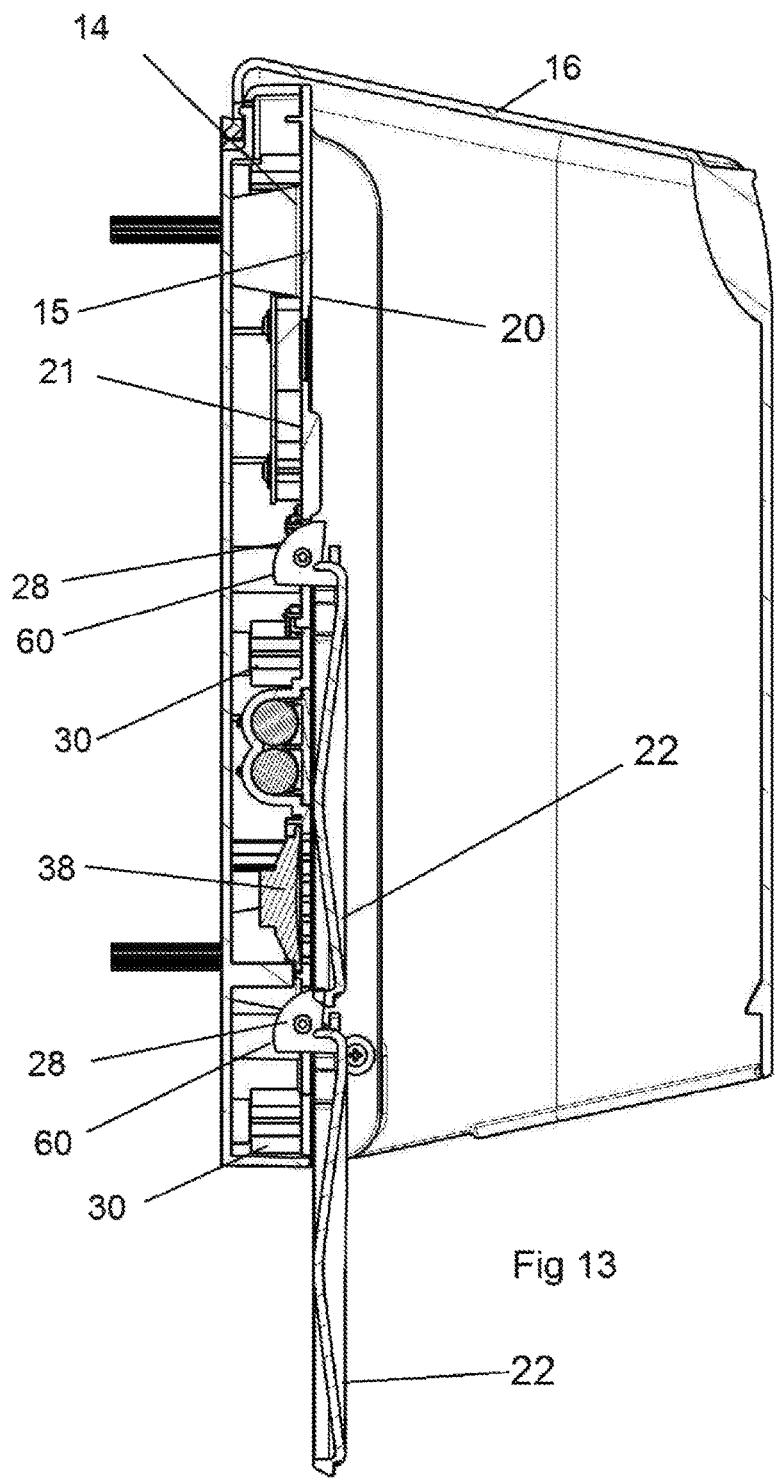
FIG. 13 is a side cross sectional view of the dispenser of FIG. 1 showing the upper platform in the vertical position.
Figure 14:
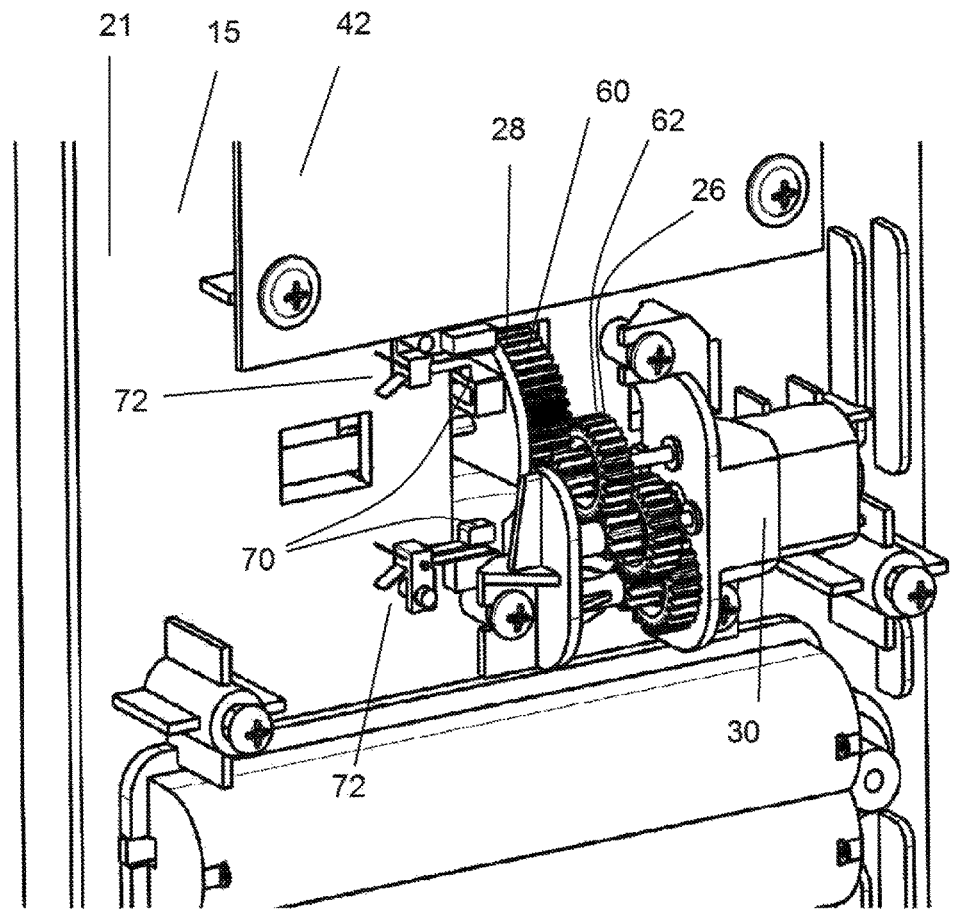
FIG. 14 is a rear perspective view of the first portion of the housing with the upper platform in the position of FIG. 13.

The motor 30 is secured to the second surface 21 of the planar member 15 on a lateral side of the aperture 27. A shaft of the motor 30 extends horizontally and the cog 62 is oriented to rotate about a horizontal axis. Operation of the motor 30 in a first direction therefore moves the protrusion 28 upwardly (as shown in FIGS. 12 and 13), thereby moving the platform 22 to the vertical position, and operation of the motor 30 in a second direction moves the protrusion 28 downwardly thereby moving the platform 22 to the horizontal position.

Lugs 70 are provided on the protrusion 28 and the platform 22 to engage with switches 72 to control operation of the motor 30. The switches are located adjacent upper and lower sides of the aperture 27. The lugs 70 are provided on the protrusion 28, the upper surface of the platform 22 adjacent the first edge 24 and the lower surface of the platform. When the platform moves to the horizontal position, the lugs 70 on the upper surface of the platform 22 and the protrusion 28 engage the switches 72 and when the platform 22 moves to the vertical position, the lugs 70 on the lower surface of the platform 22 and the protrusion 28 engage the switches 72. Engagement of the switches 72 by the lugs 70 provides a signal to stop operation of the motor 30.

The dispenser 10 is provided with a timer device controllable with a control panel 34 and display 36. A battery compartment 40 is provided in the first housing portion 14 to supply power to the components of the dispenser 10. The control panel 34 and display 36 are provided on the first surface 20 of the planar member 15 such that the control panel 34 can be accessed when the housing 12 is open. The timer device controls when the support member 26 of each of the platforms 22 moves from the first position to the second position. The time of movement of each support member 26 from the first position to the second position can be set independently to particular desired times. The time of the movement of each support member 26 is set to be greater than that of any of the support members 26 below it so that the support members 26 are activated in sequence from the bottom of the housing 12 upwardly.

The dispenser 10 is also provided with a speaker 38 that emits a sound when an item is dispensed. The sound emitted may be set through the control panel 34 and may be a recorded sound. The sound may, for example, be a command spoken by the owner of the animal recorded into the device, to let the animal know that an item has been dispensed The first housing portion 14 includes also a rear cover 64. The rear cover 64 comprises a planar wall member 66 having transverse flanges 68 extending along opposed sides thereof. The rear cover 64 is dimensioned such that the planar member 15 can be received into the rear cover 64 such that each of the lip portions 17 is located inside and adjacent one of the flanges 68. A relatively thin cavity is defined between the rear cover 64 and the planar member 20 in which is provided the motors 30, a circuit board 42 for circuitry of the control panel 34, the speaker 38 and the battery housing 40. The first and second side walls 50 and 52 of the second housing portion 16 are located between the lip portions 17 and the flanges 68 of the rear cover 64.

In use, a number of items are placed on the platforms 22 from the bottom up in the order in which they are to be dispensed and the times at which each item is to be dispensed is set by the control panel 34 and display 36. The housing 12 is then closed. At the designated time, the support member 26 for a platform 22 moves to the second position and the platform 22 pivots downwardly (as shown in FIGS. 9 to 14) and the item falls downwardly through the housing 12 and out of the lower opening. The items can then easily be replaced by opening the housing 12 and the dispenser 10 reset.

It will be appreciated that, in other embodiments, the support members 26 may include alternative constructions. For example, in one embodiment, the support members may comprise solenoids mounted in the same position as the motors 30. The shafts of the solenoids are each moveable between a first position in which it is located behind the aperture 27 and a second position in which it is withdrawn away from the aperture 27. The protrusion 28 would then be shaped such that the shaft of the solenoid engages with the protrusion to retain the platform 22 in the horizontal position and disengages with the protrusion 28 in the retracted position to allow the platform 22 to rotate downwardly to the vertical position.

It will be readily apparent to persons skilled in the relevant arts that various modifications and improvements may be made to the foregoing embodiments, in addition to those already described, without departing from the basic inventive concepts of the present invention.

What is claimed is:

1. A dispenser comprising:
  a first housing portion comprising an elongate planar member;
  a second housing portion moveable between an open position and a closed position such that, in the closed position, a tubular chamber having an open lower end is defined between the first and second housing portions;
  a plurality of platforms each pivotally secured adjacent a first edge thereof to a first surface of the elongate planar member such that each platform is pivotable between a first position and a second position;

a protrusion provided on the first edge of each platform such that the protrusion extends through an aperture in the elongate planar member when the platform is in the first position; and a support member provided on a second opposite surface of the elongate planar member adjacent each of the apertures;

wherein each support member is moveable between a first position in which the support member engages with the protrusion to hold the platform in the first position and a second position in which the platform moves to the second position thereof, wherein each protrusion includes an arcuate surface having teeth thereon and wherein the support member comprises a cog driven by a motor such that operation of the motor in a first direction moves the protrusion upwardly, thereby moving the platform to a vertical position, and operation of the motor in a second direction moves the protrusion downwardly thereby moving the platform to a horizontal position.

2. The dispenser in accordance with claim 1, wherein the first housing portion comprises a rear cover comprising a planar wall member having transverse flanges extending along opposed sides thereof such that the elongate planar member is received into the rear cover such that a relatively thin cavity is defined between the rear cover and the elongate planar member, in which the support members are provided.

3. The dispenser in accordance with claim 1, wherein the platforms are secured along the length of the first housing portion such that when the first housing portion is mounted vertically, wherein each subsequent platform is located above a previous platform.

4. The dispenser in accordance with claim 3, wherein the first edges of the platforms are linear and pivotally connected to the first surface such that each platform can pivot about an axis parallel to the first edge between the first position, in which the platform extends generally horizontally, and the second position in which the platform extends generally vertically.

5. The dispenser in accordance with claim 4, wherein each of the apertures is provided in the elongate planar member adjacent a midpoint of the first edge.

6. The dispenser in accordance with claim 4, wherein the second housing portion comprises an elongate member having an arcuate transverse cross section pivotally connected at a lower end to a lower end of the first housing portion.

7. The dispenser in accordance with claim 6, wherein each of the platforms includes an arcuate second edge connecting ends of the first edge such that the curvature of the arcuate second edge is complementary to that of the inner surface of the second housing portion.

8. The dispenser in accordance with claim 7, wherein there is provided a timer such that the platforms are moved from the first positions to the second positions in sequence from a lowermost platform to an uppermost platform.

9. The dispenser in accordance with claim 8, wherein the arcuate surface is located such that the center of the arc defined by the arcuate surface is coaxial with the axis of rotation of the platform.

10. The dispenser in accordance with claim 9, wherein gearing is provided between the motor and the cog.

11. The dispenser in accordance with claim 10, wherein the motor is secured to the second surface of the elongate planar member on a lateral side of the aperture and a shaft of the motor extends horizontally such that the cog is oriented to rotate about a horizontal axis.

12. The dispenser in accordance with claim 11, wherein a pair of hinge mechanisms are provided on each platform located on the first edge thereof, either side of the aperture.

13. The dispenser in accordance with claim 12, wherein each of the hinge mechanisms includes a first hinge portion comprising a shaft provided in a notch in the first edge of the platform and each of the second hinge portions comprises a protruding portion extending outwardly from the first surface of the elongate planar member having a recess in an upper side thereof to receive the corresponding shaft of the platform.

14. The dispenser in accordance with claim 13, wherein the dispenser is provided with a control panel and display in order to control the timer device and set the times when the support members of each of the platforms moves from the first position to the second position.

15. The dispenser in accordance with claim 14, wherein the control panel and display is provided on the first surface of the elongate planar member of the first housing portion.

16. The dispenser in accordance with claim 15, wherein the dispenser is provided with a speaker that can emit a sound when one of the platforms moves from the first to the second position.

17. The dispenser in accordance with claim 16, wherein the sound emitted can be recorded through the control panel.

18. The dispenser in accordance with claim 17, wherein the first housing portion comprises a rear cover comprising a planar wall member having transverse flanges extending along opposed sides thereof such that the elongate planar member is received into the rear cover such that a relatively thin cavity is defined between the rear cover and the elongate planar member, in which the support members are provided.

* * * * *